United States Patent [19]
Duggan

[11] Patent Number: 5,501,638
[45] Date of Patent: Mar. 26, 1996

[54] BEARING CUP RETAINER STRAP FOR UNIVERSAL JOINT

[75] Inventor: James A. Duggan, Temperance, Mich.

[73] Assignee: Dana Corporation, Toledo, Ohio

[21] Appl. No.: 219,385

[22] Filed: Mar. 29, 1994

[51] Int. Cl.⁶ ...................................................... F16D 3/40
[52] U.S. Cl. ........................................ 464/130; 464/135
[58] Field of Search .................................. 464/130, 135, 464/134, 128, 136, 902

[56] References Cited

U.S. PATENT DOCUMENTS

| | | |
|---|---|---|
| 1,853,300 | 4/1932 | Cutting . |
| 2,273,920 | 2/1942 | Anderson .................................. 464/130 |
| 2,299,001 | 10/1942 | Anderson .................................. 464/130 |
| 2,636,362 | 4/1953 | Dunn . |
| 2,700,581 | 1/1955 | Migny . |
| 2,770,114 | 11/1956 | Slaght . |
| 3,481,159 | 12/1969 | Kayser . |
| 3,492,710 | 2/1970 | Pitner . |
| 4,682,972 | 7/1987 | Olschewski .............................. 464/130 |
| 4,768,995 | 9/1988 | Mangiavacchi ...................... 464/130 X |
| 4,861,314 | 8/1989 | Mazziotti ................................. 464/130 |
| 5,376,051 | 12/1994 | Valencic ............................... 464/135 X |

Primary Examiner—Daniel P. Stodola
Assistant Examiner—Eileen A. Dunn
Attorney, Agent, or Firm—MacMillan, Sobanski & Todd

[57] ABSTRACT

A bearing cup retainer strap for a universal joint assembly prevents a bearing cup from rotating relative to an end yoke during use. The retainer strap includes a central body portion which has an inner surface adapted to extend about and engage a portion of the bearing cup to retain the bearing cup in engagement with a recess formed in an arm of the end yoke. A friction material is disposed between the inner surface of the central body portion of the retainer strap and the bearing cup. The friction material is adapted to increase the coefficient of friction between the bearing cup and the retainer strap so as to prevent relative rotation therebetween. The retainer strap is relatively simple and inexpensive, and does not require any specific orientation relative to the arm of the end yoke or to the bearing cup.

20 Claims, 2 Drawing Sheets

BEARING CUP RETAINER STRAP FOR UNIVERSAL JOINT

BACKGROUND OF THE INVENTION

This invention relates in general to universal joints and in particular to an improved strap for retaining a bearing cup mounted on a universal joint cross to an end yoke and for preventing relative rotation therebetween during use.

Universal joints are well known devices which provide a driving connection between two members adapted to rotate about non-aligned axes of rotation. Universal joints of this type are widely used between rotatable drive shafts in vehicle drive train systems. Typically, such universal joints include a cross having a central body portion with four trunnions extending outwardly therefrom. The trunnions are oriented in a single plane and extend at right angles relative to one another. A bearing cup is mounted on the end of each of the trunnions. Needle bearings or similar friction reducing means are provided between each of the trunnions and its associated bearing cup to permit the bearing cup to rotate freely relative to the trunnion. One pair of opposed bearing cups is connected to a first end yoke secured to the first drive shaft, while the other pair of opposed bearing cups is connected to a second end yoke secured to the second drive shaft.

When the axes of rotation of the two drive shafts are not co-axially aligned during operation, the bearing cups rotate relative to the trunnions in an oscillating fashion so as to permit the driving connection. It is desirable that the bearing cups be fixed in position relative to the end yokes connected thereto such that no relative rotation occurs therebetween. Otherwise, wear will occur in the end yokes and in the outer surfaces of the bearing cups, causing premature failure of the universal joint.

Many structures are known for preventing relative rotation between the bearing cups and the end yokes. For example, it is known to secure a retainer strap to the arms of a half round end yoke so as to frictional engage the bearing cup and retain it within a recess formed in the end yoke. However, it has been found that such frictional engagement has not, of itself, been sufficient to prevent relative rotation between the end yoke and the bearing cup under all operating conditions. It is also known to provide a flange on the retainer strap which, when assembled, extends into engagement with a recess formed in the closed end surface of the bearing cup. Such a structure, while effective in preventing relative rotation between the bearing cup and the end yoke, requires the proper orientation of the retainer strap relative to the end yoke, and of the bearing cup relative to the retainer strap. This structure, as with other bearing cup retainer straps known in the art, thus requires additional labor to construct and install, increasing the cost of the universal joint assembly. Accordingly, it would be desirable to provide an improved universal joint assembly with a bearing cup retainer strap which is simple and inexpensive to construct and assemble.

SUMMARY OF THE INVENTION

This invention relates to an improved bearing cup retainer strap for a universal joint assembly which prevents a bearing cup from rotating relative to an associated half round end yoke during use. The retainer strap includes a body portion having a surface adapted to extend about and engage a portion of the bearing cup to retain it in engagement with a recess in an arm of the end yoke. A pair of opposed end portions integral with the central body portion are adapted to be secured to the arm of the end yoke. A friction material is applied to at least a portion of the inner surface of the central body portion of the retainer strap. This material is adapted to increase the coefficient of friction between the bearing cup and the inner surface of the central body portion so as to prevent relative rotation therebetween.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
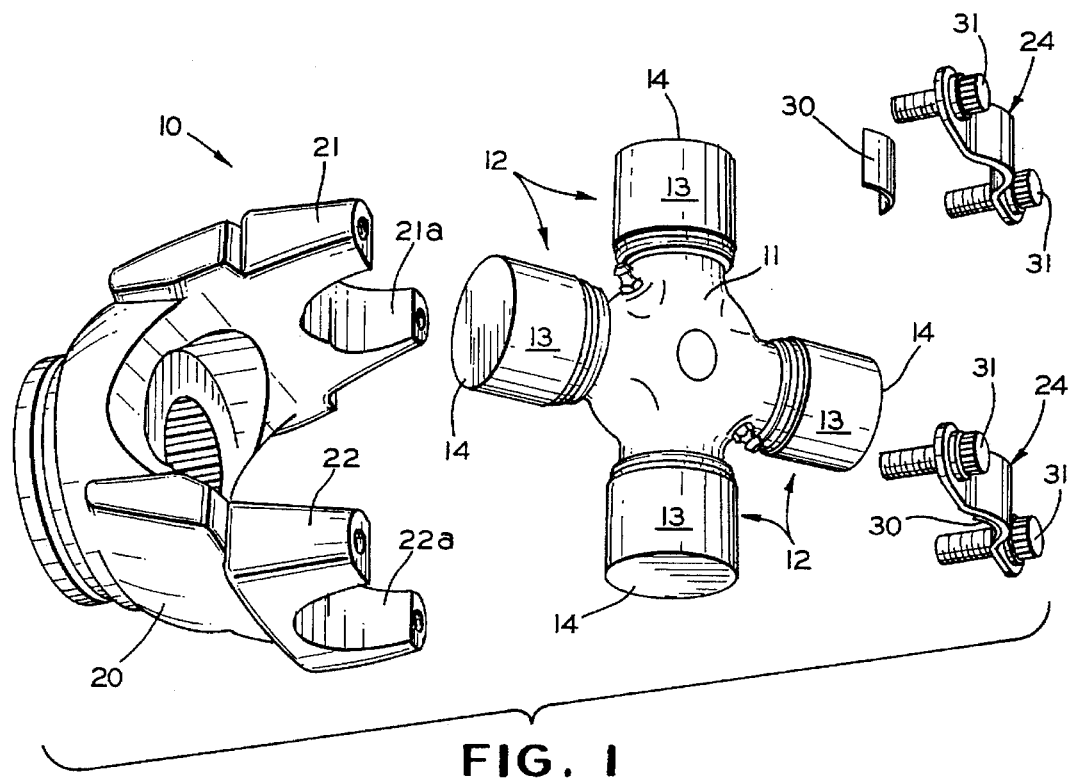
FIG. 1 is an exploded perspective view of a universal joint assembly and a half round end yoke including a bearing cup retainer strap in accordance with this invention.

Referring now to the drawings, there is illustrated in FIG. 1 an exploded perspective view of a universal joint assembly, indicated generally at 10, in accordance with this invention. The assembly 10 includes a conventional cross member 11 having four trunnions extending outwardly in a common plane and at right angles to one another. A bearing cup, indicated generally at 12, is mounted on the end of each of the trunnions. Each of the bearing cups 12 is formed generally in the shape of a hollow cylinder having an outer circumferential surface 13 and a closed end surface 14. Needle bearings, a plastic cup-shaped bearing, or similar bearing means (not shown) are provided between each of the bearing cups 12 and its associated trunnion to permit relative rotation therebetween. The bearing cups 12 are generally formed of steel.

The universal joint assembly 10 further includes a half round end yoke 20 which is typically secured to a drive shaft (not shown). The yoke 20 includes a pair of arms 21 and 22 having respective semi-cylindrical recesses 21a and 22a formed in the ends thereof. When the cross 11 is assembled to the end yoke 20, two opposed bearing cups 12 are received in the recesses 21a and 22a formed in the arms 21 and 22, respectively. The other pair of opposed bearing cups are received in recesses formed in the arms of a second yoke (not shown).

Figure 2:
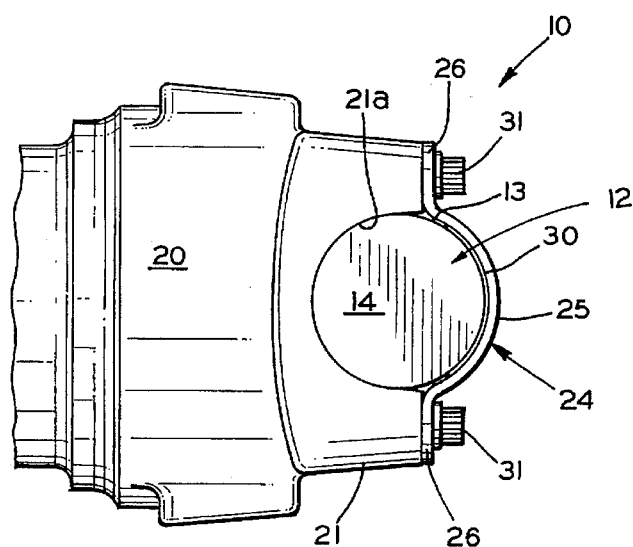
FIG. 2 is a plan view of the universal joint assembly illustrated in FIG. 1 shown assembled.
Figure 3:
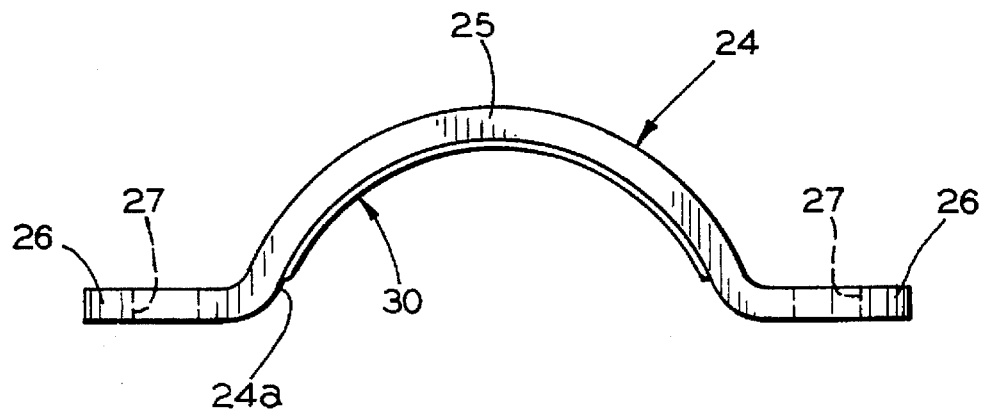
FIG. 3 is an enlarged side elevational view of the bearing cup retainer strap of the invention.
Figure 4:
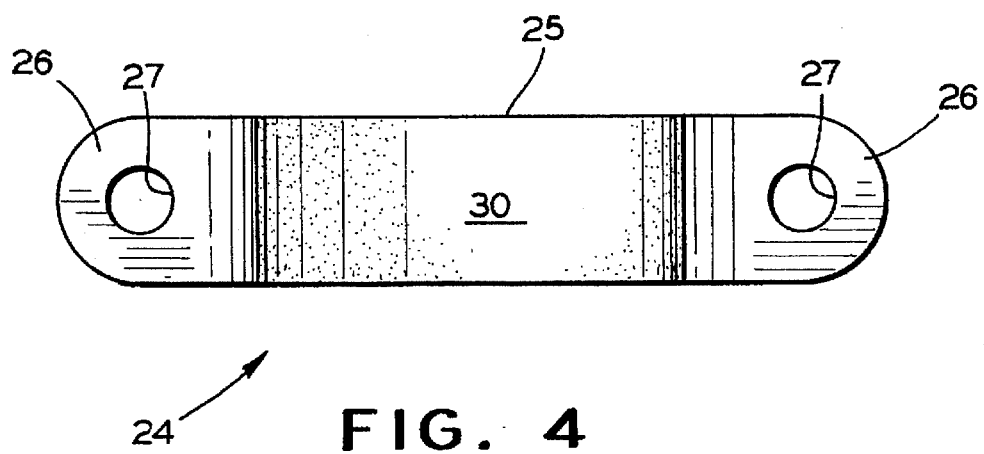
FIG. 4 is an enlarged front elevational view of the bearing cup retainer strap of the invention.

A retainer strap 24 is provided for retaining each of the bearing cups 12 within its associated semi-cylindrical recess 21a and 22a of the end yoke 20, as illustrated in FIG. 2. As best shown in FIGS. 3 and 4, the retainer strap 24 includes a curved central portion 25 having a pair of end portions 26 extending outwardly therefrom. Each of the end portions 26 is provided with an aperture 27 for securing the retainer strap 24 to one of the arms 21, 22 of the end yoke 20. While the means illustrated for securing the retainer strap 24 to the end yoke 20 is embodied as the opposed end portions 26 and associated apertures 27, any suitable means may be employed in accordance with the invention. The retainer strap 24 is generally formed of steel.

When the retainer strap 24 is assembled as described below, a layer 30 of a relatively high friction material is disposed between a surface 24a of the central body portion 25 of the retainer strap 24 and the outer circumferential surface 13 of the bearing cup 12. The layer 30 is formed of a material which provides an increased coefficient of friction between the inner surface of the retainer strap 24 and the outer circumferential surface 13 of the bearing cup 12. The coefficient of friction with the layer 30 is higher than the coefficient of friction between these surfaces in the absence of the layer 30. A preferred friction material is 240 grid emery cloth. Additional examples of suitable friction materials include those materials used conventionally as the material for brake or clutch linings.

The layer 30 of friction material can be supported on the inner surface of the retainer strap 24 by any suitable means, such as by adhesively bonding the layer 30 thereto. Alternatively, the layer 30 may be positioned between the retainer strap 24 and the bearing cup 12 and retained there by means of the force applied by the retainer strap 24 against the bearing cup 12.

With a bearing cup 12 received one of the recesses 21a, 22a in the end yoke 20, the retainer strap 24 is positioned on the associated arm 21, 22 thereof. The curved central body portion 25 of the retainer strap 24 extends about a portion of the outer circumferential surface 13 of the bearing cup 12. The layer 30 of friction material is positioned between the outer circumferential surface 13 of the bearing cup 12 and the central body portion 25 of the retainer strap 24. The apertures 27 in the end portions 26 of the retainer strap 24 are aligned with associated apertures in the arm 21, 22 of the end yoke 20. The end portions 26 are secured to the arm 21, 22 of the end yoke 20 by any suitable means, such as by the threaded fasteners 31.

When the end portions 27 of the retainer strap 24 are secured to the arm 21, 22, the curved central body portion 25 of the retainer strap 24 exerts a compressive force on the outer circumferential surface 13 of the associated bearing cup 12. This compressive force tightly clamps the layer 30 of friction material between the inner surface of the retainer strap 24 and the bearing cup 12. The resulting coefficient of friction is high enough that the frictional force created is sufficient to prevent any relative rotation between the retainer strap 24 and the associated bearing cup 12 during operation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A retainer strap for securing a bearing cup within a recess formed in an arm of a yoke of a universal joint assembly comprising:

a body portion including a surface adapted to extend about and engage a portion of the bearing cup to retain the bearing cup in engagement with the recess in the arm of the yoke;

means for securing said body portion to the arm of the yoke; and a friction material secured to said surface of said body portion, said friction material defining a coefficient of friction which is greater than a coefficient of friction defined by said surface of said body portion, said friction material adapted to frictionally engage the bearing cup when said body portion is secured to the yoke so as to prevent relative rotation therebetween.

2. The retainer strap defined in claim 1 wherein said body portion is curved, and wherein said surface is provided on said curved body portion.

3. The retainer strap defined in claim 1 wherein said body portion is formed from steel.

4. The retainer strap defined in claim 1 wherein said body portion includes a central portion, and wherein said means for retaining includes a pair of end portions provided on opposite sides of said central portion.

5. The retainer strap defined in claim 4 wherein said means for retaining further includes an aperture formed through each of said end portions.

6. The retainer strap defined in claim 4 wherein said surface is provided on said central portion of said body portion.

7. The retainer strap defined in claim 4 wherein said central portion of said body portion is curved, and wherein said surface is provided on said curved central portion of said body portion.

8. The retainer strap defined in claim 1 wherein said friction material is formed from emery cloth.

9. The retainer strap defined in claim 1 wherein said friction material is adhered to said surface of said body portion.

10. A universal joint assembly comprising:

a yoke including an arm having a recess formed therein;

a cross having an outwardly extending trunnion;

a bearing cup rotatably mounted on an end of said trunnion, said bearing cup including an outer circumferential surface, a first portion of said outer circumferential surface engaging said recess formed in said yoke arm;

a retainer strap secured to said arm of said yoke, said retainer strap including a surface extending about a second portion of said outer circumferential surface of said bearing cup to retain said bearing cup in engagement with said recess of said arm; and a friction material secured to said surface of said retainer strap, said friction material defining a coefficient of friction which is greater than a coefficient of friction defined by said surface of said retainer strap, said friction material frictionally engaging said second portion of said outer circumferential surface of said bearing cup when said retainer strap is secured to said yoke so as to prevent relative rotation therebetween.

11. The universal joint assembly defined in claim 10 wherein said retainer strap is curved, and wherein said surface is provided on said curved retainer strap.

12. The universal joint assembly defined in claim 10 wherein said retainer strap is formed from steel.

13. The universal joint assembly defined in claim 10 wherein said retainer strap includes a central portion, and wherein said means for retaining includes a pair of end portions provided on opposite sides of said central portion.

14. The universal joint assembly defined in claim 13 wherein said means for retaining further includes an aperture formed through each of said end portions.

15. The universal joint assembly defined in claim 13 wherein said surface is provided on said central portion of said retainer strap.

16. The universal joint assembly defined in claim 13 wherein said central portion of said retainer strap is curved, and wherein said surface is provided on said curved central portion of said retainer strap.

17. The universal joint assembly defined in claim 10 wherein said friction material is formed from emery cloth.

18. The universal joint assembly defined in claim 10 wherein said friction material is adhered to said surface of said retainer strap.

19. A universal joint assembly comprising:

a yoke including an arm having a recess formed therein;

a cross having an outwardly extending trunnion;

a bearing cup rotatably mounted on an end of said trunnion, said bearing cup including an outer circumferential surface, a first portion of said outer circumferential surface engaging said recess formed in said yoke arm;

a retainer strap secured to said arm of said yoke, said retainer strap including a surface extending about a second portion of said outer circumferential surface of said bearing cup to retain said bearing cup in engagement with said recess of said arm; and a layer of emery cloth disposed between said retainer strap and said second portion of said outer circumferential surface of said bearing cup, said layer of emery cloth frictionally engaging said second portion of said outer circumferential surface of said bearing cup when said retainer strap is secured to said yoke so as to prevent relative rotation therebetween.

20. The universal joint assembly defined in claim 19 wherein said retainer strap includes a crowed central portion, and wherein said means for retaining includes a pair of end portions provided on opposite sides of said central portion, each of said end portions having an aperture formed therethrough.

* * * * *